United States Patent
Potter et al.

(10) Patent No.: US 7,016,341 B2
(45) Date of Patent: *Mar. 21, 2006

(54) MULTIMEDIA CALL CENTER (75) Inventors: John M M Potter, Suffolk (GB); Russell J. Lang, MT Waverley (AU)

(73) Assignee: British Telecommunications public limited company, London (GB)

(*) Notice: Subject to any disclaimer, the term of this patent is extended or adjusted under 35 U.S.C. 154(b) by 91 days.

This patent is subject to a terminal disclaimer.

(21) Appl. No.: 10/716,441

(22) Filed: Nov. 20, 2003

(65) Prior Publication Data

US 2004/0228328 A1 Nov. 18, 2004

Related U.S. Application Data (62) Division of application No. 09/029,318, filed on Feb. 26, 1998, now Pat. No. 6,728,236, which is a continuation of application No. 08/758,424, filed on Nov. 29, 1996, now abandoned.

(30) Foreign Application Priority Data

Oct. 16, 1996 (GB) ............................................. 9621524
Oct. 8, 1997 (GB) .............................. PCT/GB97/02782

(51) Int. Cl.
*H04L 12/66* (2006.01)

(52) U.S. Cl. ........................ 370/352; 370/401; 370/270; 379/265.09

(58) Field of Classification Search ....................... None
See application file for complete search history.

(56) References Cited

U.S. PATENT DOCUMENTS

| | | | |
|---|---|---|---|
| 5,341,374 A | 8/1994 | Lewen et al. |
| 5,533,102 A | 7/1996 | Robinson et al. |
| 5,742,596 A | 4/1998 | Baratz et al. |
| 5,793,861 A | 8/1998 | Haigh |
| 5,867,494 A | 2/1999 | Krishnaswamy et al. |
| 5,909,431 A | 6/1999 | Kuthyar et al. |
| 5,963,547 A | 10/1999 | O'Neill et al. |
| 6,006,253 A | 12/1999 | Kumar et al. |
| 6,031,836 A | 2/2000 | Haserodt |
| 6,094,479 A | 7/2000 | Lindeberg et al. |

*Primary Examiner*—Creighton Smith
(74) *Attorney, Agent, or Firm*—Nixon & Vanderhye P.C.

(57) ABSTRACT

A Multimedia Telecommunications Call Center provides integrated video, audio, data and telephony functionality, together with connectivity to the Internet, ISCN, PSTN, and other wide-area networks. The Call Center includes a Local Area Network having a Gateway and a Gatekeeper. Incoming multimedia calls are received by the Gateway and are permitted onto the network under control of the Gateway and are permitted onto the network under control of the Gatekeeper. Communications between the Gateway and the Gatekeeper preferably take place across the network and comply with the ITU H.323 standard protocol. Communications between the Gatekeeper and the Call Manager preferably take place across the network and comply with the European Computer Manufacturers Association CSTA standard protocol.

8 Claims, 8 Drawing Sheets

MULTIMEDIA CALL CENTER

RELATED APPLICATION

This application is a division of application Ser. No. 09/029,318, filed Feb. 26, 1998, now U.S. Pat. No. 6,728, 236, which is a continuation of application Ser. No. 08/758, 424 filed Nov. 29, 1996 now abandoned and CPA Ser. No. 09/758,424 filed Jul. 6, 1999, the entire contents of which are hereby incorporated by reference in this application.

BACKGROUND OF THE INVENTION

1. Field of the Invention

The present invention relates to a Multimedia Telecommunications Call Centre, and in particular although not exclusively, to such a Call Centre which is capable of handling in an integrated way not only standard telephony services but also communications carrying data and/or video information.

2. Related Art

Figure 1:
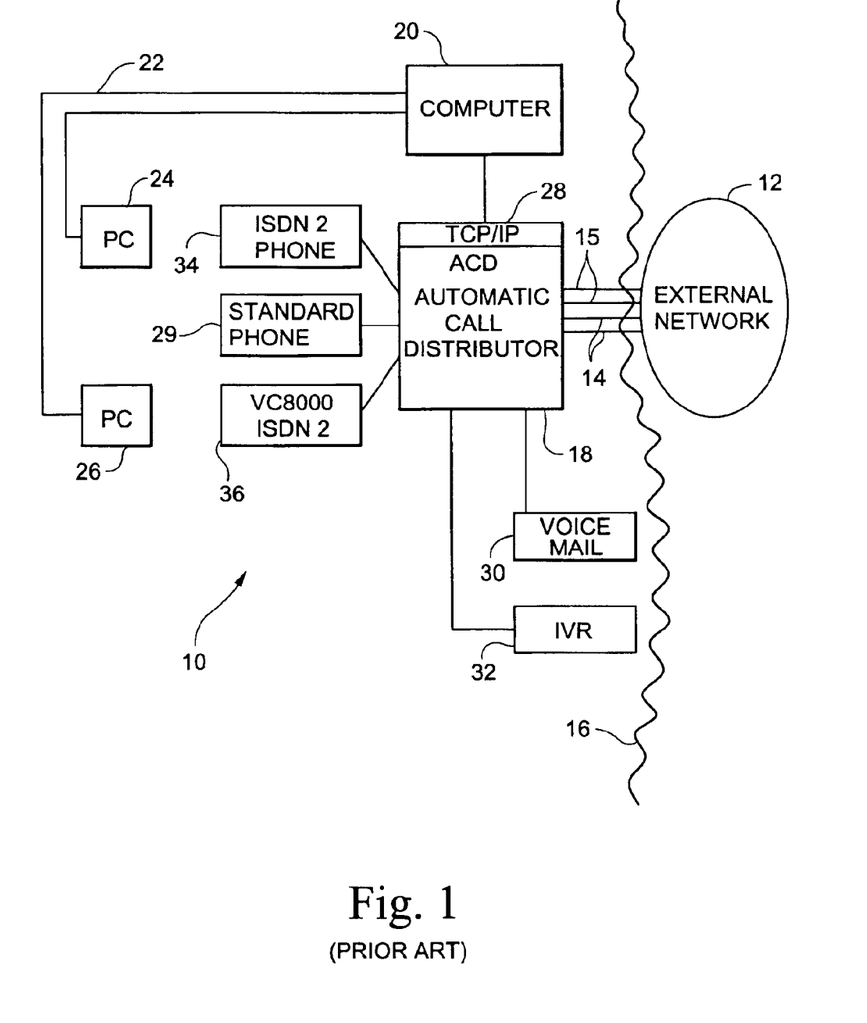
FIG. 1 shows a prior art Call Centre, as previously described.

A typical prior art Call Centre is shown schematically in FIG. 1. The telephony and computer equipment of an individual organisation, illustrated generally by the reference numeral 10, is coupled with an external network 12, for example the public telephone network, via a series of lines 14, 15. These lines may be of various types, for example standard telephone lines for voice traffic, ISDN lines, and so on. The equipment owned by the organisation is delimited in the Figure from the external network 12 by the wavy line 16. It is to be understood that equipment to the left of that line will normally be privately owned, although it need not necessarily all reside in one building or indeed even at one site. For large organisations, the privately owned equipment may be spread across several sites, and perhaps in several different countries, with the elements being linked by an appropriate private telephony and/or computer network. In this description, anything to the left of the wavy line 16 will be referred to as being in the "Call Centre domain".

Incoming calls enter the organisation by the lines 14, 15 and are first directed to an ACD or automatic call distributor 18. This strips off the calling line ID from the incoming call and, with the aid of an intelligent interface, arranges for the call to be routed across a LAN or WAN 22 to the most appropriate person within the call centre domain, under control of a computer 20. Typically, communications between the ACD 18 and the computer 20 are effected via CSTA (Computer Supported Telecommunications Applications—a standard interface defined by the European Computer Manufacturers Association in ECMA Technical Report TR/68 of December 1994). To that end, the ACD may incorporate a TCP/IP interface 28.

The ACD 18 is capable of dealing with standard (voice) telephony, as well as ISDN services. An incoming voice message may be automatically switched to an appropriate standard telephone 29, to a voice mail unit 30 or to an IVR (Interactive Voice Response) unit 32. Similarly, incoming ISDN calls are directed to an appropriate ISDN 2 phone 34 or to a VC 8000 terminal 36, which allows video conferencing.

In addition to the voice or ISDN services, the computer 20 can arrange for information relating to the call to be displayed on a user's computer 24, 26.

The prior art system illustrated in FIG. 1 is technically complex, since the ACD has to interface with a large number of different devices, each making use of different protocols. In FIG. 1, for example, the ACD 18 has to handle audio, video, data and telephony services. This causes difficulties, not only in setting up such a system initially, but also in the expansion of such systems, for example when the organisation in question requires more terminals or additional services. The maintenance of such a system requires the use of relatively skilled personnel.

SUMMARY OF THE INVENTION

According to the present invention there is provided a Multimedia Telecommunications Call Centre comprising a computer network adapted to carry addressed Multimedia calls, a Gateway to the network adapted to receive multimedia calls for transmission by the network, and a Call Manager arranged to effect addressing to a desired network node of received multimedia calls.

In the present specification and claims, the term "Multimedia" refers to a device which is capable of dealing with one or more (and preferably two or more) of the following types of call: Standard Audio (Voice) calls, Video and Data. The data functionality may, but need not, comply with the Data Conferencing Standard T.120 of the International Telecommunication Union.

The present invention provides the possibility, for the first time, of achieving integrated video, audio data and telephony functionality in the Call Centre environment, together with the possibility of connectivity to the Internet, ISDN, PSTN and other wide-area networks.

Preferably, the Call Centre of the present invention uses distributed technology, across a local area network, and provides for a separate Gateway to the LAN and Gatekeeper for the LAN. The distributed nature of the Call Centre in the preferred embodiment means that the Gateway, and possibly even the Gatekeeper, can reside within an external network rather than being an overhead on the customer's premises.

The integrated solution which the present invention provides allows for lower infrastructure costs, including a reduction in cabling costs. In addition, the Gateway may be provided as a separate network resource in the embodiment in which it comprises part of the external network, outside the customer+s premises.

Preferably, communication between the Gateway and the Gatekeeper takes place across the LAN and uses the International Telecommunication Union H.323 standard protocol. Communication between the Gatekeeper and the computer on which the business application resides (the Call Manager) preferably also takes place across the network, this time according to the European Computer Manufacturers Association CSTA standard protocol.

The Gateway and the Gatekeeper together act as a virtual PBX (Private Branch Exchange) on the network.

The invention further extends to a method of transmitting multimedia calls within a Call Centre environment as defined by the apparatus set out above and/or as described in the specific description and the claims.

BRIEF DESCRIPTION OF THE DRAWINGS

This invention may be carried into practice in a number of ways and a preferred Multimedia Call Centre embodying the invention, along with several variations, will now be described with reference to the accompanying drawings, in which:

FIG. 5 shows how an outgoing call is dealt with;

DETAILED DESCRIPTION OF EXEMPLARY EMBODIMENTS

Figure 2:
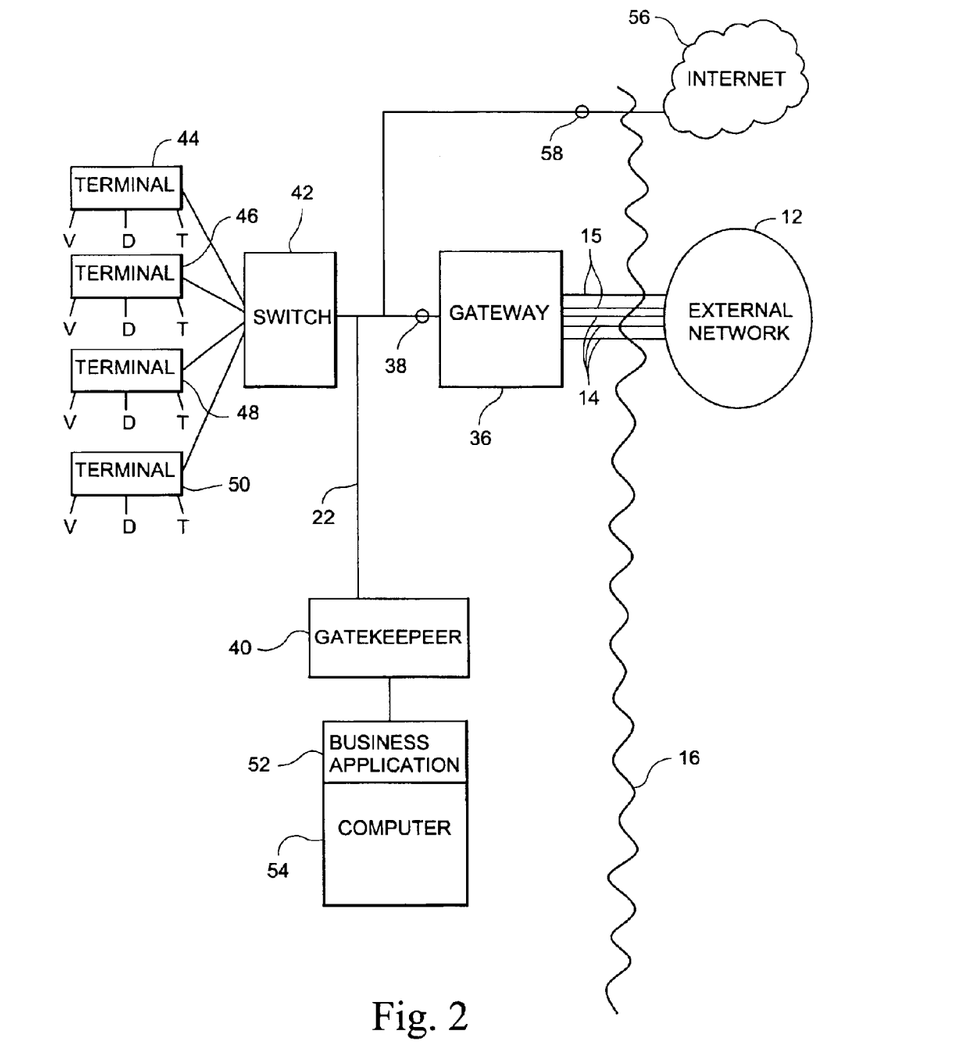
FIG. 2 shows a Multimedia Call Centre according to a preferred embodiment of the present invention.

A multimedia Call Centre in accordance with a preferred embodiment of the present invention is shown schematically in FIG. 2. In this Figure, and in subsequent Figures, like elements are given the same numbers as those already used in FIG. 1.

In the embodiment of FIG. 2, the ACD 18 has been eliminated, and the Call Centre is now fully integrated with the LAN or WAN 22. The ACD is replaced by a gateway 36 which is connected directly into the LAN at a node 38. The LAN also includes a Gatekeeper 40, the purpose of which is to allow/deny access to the LAN on receipt of a request for bandwidth by an incoming call. The Gatekeeper 40 therefore effectively acts as a "policeman" or bandwidth manager, and protects the LAN against a large number of calls (particularly video calls) being placed at once. The Gatekeeper also provides the look-up table between the numbering scheme used by LAN 22 and that used by the external network 12.

An incoming call from the external network 12 now arrives at the Gateway 36, which then makes a request of the Gatekeeper 40 to enquire whether the call may be placed onto the LAN 22. If the Gatekeeper grants permission, the call is placed onto the LAN from where it may be directed via a switch 42 to an appropriate terminal 44,46,48,50. As will be understood by those skilled in the art, the switch 42 may be omitted depending on the network protocols that are used. Each terminal incorporates, as shown, facilities for handling video, data and telephony services, (or at least some of these).

Incoming and outgoing calls interface with a business application 52, running on a networked computer 54. Access to the Internet 56 is also provided, via a dedicated network node 58.

The interface between the Gatekeeper 40 and the Computer 54 uses the CSTA standard, thereby presenting an unchanged and standardised interface to any business application 52.

In this arrangement, the Gateway 36 and the Gatekeeper 40 effectively act together as a virtual PBX (Private Branch Exchange). The Gateway and the Gatekeeper therefore need to take on additional functionality, such as call queuing, under control of the Business Application 52.

The communications across the LAN 22 may use any desired protocol, for example TCP/IP. The LAN itself could be of any convenient type, such as an Ethernet or a Token Ring network. Communications between the Gateway 36 and the Gatekeeper 40 may be encoded using a standard H.323 protocol as defined by the recommendation of the International Telecommunication Union dated 28 May 1996, and entitled *"Visual Telephone Systems and Equipment for Local Area Networks which provide a non-guaranteed quality of service"*.

Figure 3:
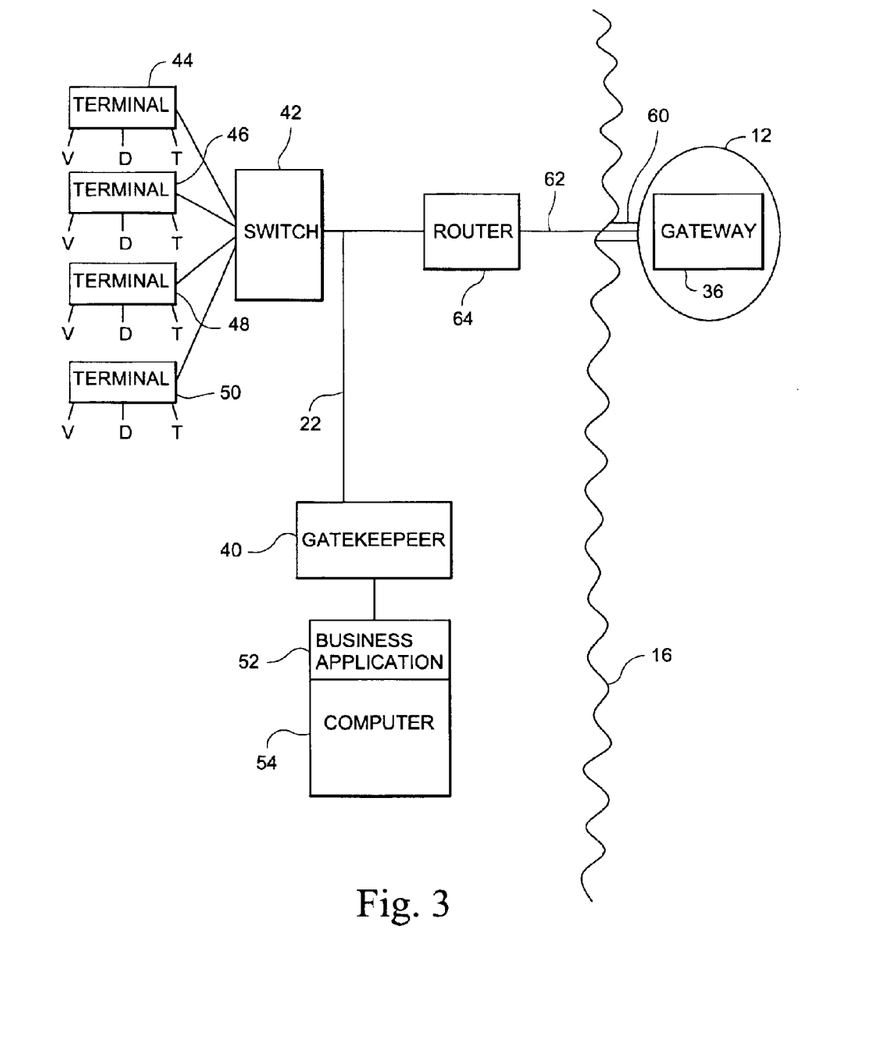
FIG. 3 shows a variant of the embodiment of FIG. 2.

An alternative embodiment, and a further development, is shown in FIG. 3. Here, the Gateway 36 now resides within the external network 12 rather than remaining an overhead on the premises of the individual organisation. Communication between the Gateway and the organisation is now via a secure IP (Internet Protocol) pipe 60 which links to a line 62 on the organisation's premises. This itself links with a router 64 on the LAN 22. The advantage of such an arrangement is that the organisation now needs only a single outgoing line 62, rather than the plurality of lines 14, 15 of different types which is required in the embodiment of FIG. 2. The expense of purchasing and maintaining the Gateway now falls on the supplier of the external network 12, rather than on the individual customer.

The schematic diagrams of FIGS. 2 and 3 will now be described in rather more detail.

Figure 4:
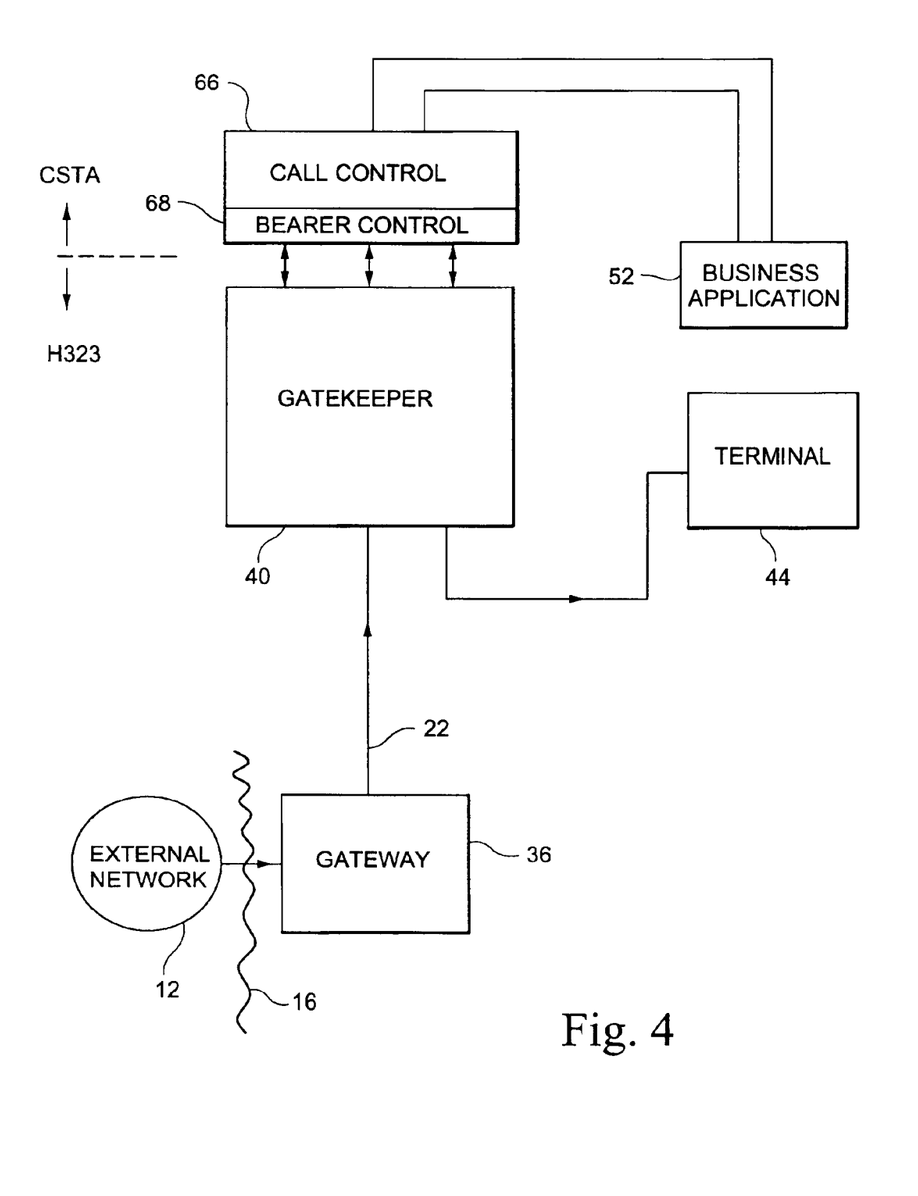
FIG. 4 illustrates the interaction between the signalling domains, namely CSTA and H.323.

FIG. 4 shows in more detail the translation process between CSTA and H.323. As will be recalled from FIGS. 2 and 3, in the preferred embodiment the Gatekeeper 40 communicates with the business application using the CSTA standard, and the Gatekeeper communicates with the Gateway 36 over the LAN 22 using the H.323 standard. The translation itself is carried out at the Gatekeeper, and to that end there is provided a Call Control Layer 66 and a Bearer Control Layer 68. The call signalling for a call on the LAN 22 in H.323 protocol is translated by the Bearer Control Layer and the Call Control Layer to CSTA protocol, allowing it to be passed on to the Business Application 52. The reverse process occurs when the Business Application 52 wishes to place a call on the LAN 22.

In the embodiment shown, the Call Control Layer 66 manages the logical connections while the Bearer Control Layer 68 manages the physical connections. More specifically, the Call Control Layer performs the translation between CSTA and the interface used by the Bearer Control. The Bearer Control itself sends out the physical switching command, for example requesting a connection with terminal 44 on the LAN.

In what will be called the H.323 domain, the system uses a series of H.323 specific call signalling procedures, namely SETUP, CALL PROCEEDING, ALERTING, CONNECT, RELEASE COMPLETE. These are described in more detail in standards Q.931, H.323 and H.225 of the International Telecommunication Union. In addition, a series of registration, admissions and status signals (RAS) are used, as described in the International Telecommunication Union Standards H.323 and H.225. These are ARQ (request for admission to the LAN), ACF (admission confirmed) and ARJ (admission rejected).

In a preferred embodiment, the H.323 domain may also make use of Supplementary Services as defined in International Telecommunication Union Standard Q.932, such as the Call Transfer feature which makes use of the FACILITY message.

In the CSTA domain a different series of messages are used, the primary ones for which are as follows:

Route Request: The route request, requests the destination of a call. To aid in the selection of a destination, the Service Request includes the current destination and may include additional information.

Route Select: The route select provides the client with a destination requested by a previous Route Request or Re-Route Service.

Monitor Start: This is a request for events.

Monitor Response: Response to the above request.

Call Identifier: This is a handle which will identify any single call. A transfer or conference can result in a new Call Identifier.

Make Call Service: Originates a CSTA call between two devices. The service creates a new call and establishes a connection with the originating device. The Make Call Service also provides a CSTA Connection Identifier that identifies the Connection of the originating device.

Call Delivered: An Event report indicates that alerting (ringing) has been applied to the device.

Call Established: An Event report indicates that a device has been answered or connected to a call.

Call Cleared: An Event report indicates that a device has been cleared.

Conference Call Service: A Conference call creates a conference between an existing call and another active call at a conferencing device.

Returning to FIG. 4, it will therefore be understood that there are two main types of message flow:

(a) CSTA Call Management messages. These messages are sent down to the Gatekeeper via the Call Control Layer 66 which in turn is managed by the Business Application 52. The Business Application performs the overall Call Management Function.

(b) Call Signalling Messages in the H.323 domain. It will be understood, as discussed above, that these consist of H.323 messages along with the relevant Call Signalling Procedures within Q.931. These are sent up from the Gatekeeper to the Call Control Layer 66 in response to signalling message flows on the LAN 22.

The status of all terminals needs to be known at all times by the Business Application, for example to allow the system automatically to transfer a call from one terminal to another in the event that the desired terminal is busy. Furthermore, in the preferred embodiment, messages such as FACILITY need to be passed between the Gatekeeper and the Gateway in order to provide Call Transfer Functionality.

It should be mentioned for the sake of clarity that the CSTA standard uses a superset of the Q.931 standard to control what is referred to as a "Call Manager". This comprises the Call Control Layer 66, the Bearer Control Layer 68, and an Application Layer which will include the Business Application 52. Each of these individual layers may generically be referred to as "Call Management Layers".

The message processes involved in the H.323 domain will now be considered in more detail, before considering the messages within the CSTA domain. The process of normal call set up within the H.323 domain is that the Gateway 36 and the Gatekeeper 40 will first exchange H.323 RAS (Registration, Admissions, Status) messages using ARQ/ACF/ARJ to negotiate admission to the LAN. This is then followed by the subset referred to above of the Q.931 Call Signalling Messages, namely the SETUP message, followed by CALL PROCEEDING, ALERTING, CONNECT and RELEASE COMPLETE. Contained in the CONNECT message is the IP address on which to send reliable control messages using the standard H.245 protocol as defined by the International Telecommunication Union.

Once a reliable H.245 control channel has been established, additional channels for audio, video and data may be set up depending on the outcome of the H.245 capabilities exchange, using H.245 Logical Channel Procedures.

Within the H.323 domain, an incoming call is handled in the following way:

1. A call is received by the Gateway 36 from the External Network 12.
2. The Gateway sends an Admission Request (ARQ) to the Gatekeeper 40.
3. The Gatekeeper responds with an Admission Confirm (ACF) message, specifying that the call signalling should be sent to the Gatekeeper, instead of to the destination terminal.
4. The Gateway 36 sends a call signalling SETUP message to the Gatekeeper 40.
5. The Gatekeeper sends the contents of the SETUP message to the Call Manager in the CSTA domain.
6. The Call Manager informs the Gatekeeper which H.323 terminal should take the call.
7. The Gatekeeper then sends the redirected SETUP message to the relevant H.323 terminal 44.

Figure 5:
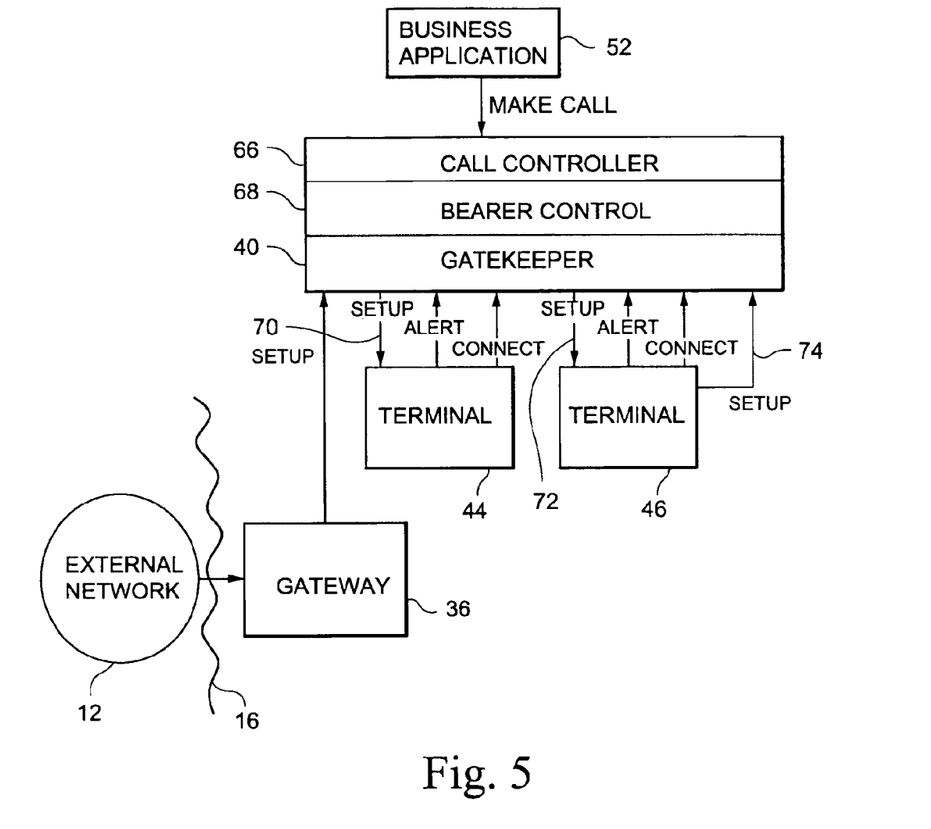

A slight complexity arises in connection with outgoing calls within the H.323 domain, and reference should be made to FIG. 5. If the Business Application 52 wishes to arrange a call between a first Originating Terminal 46 and a second Destination Terminal 44, it first issues a Make Call command to the Call Control 66, which then instructs the Gatekeeper 40 to issue the appropriate SETUP messages. The SETUP message 70 from the Gatekeeper to the Destination Terminal 44 occurs as usual, since so far as the terminal 44 is concerned it is simply being set up to receive an incoming call. The situation is different, however, with the originating terminal 46, since under normal circumstances the Gatekeeper would simply issue a SETUP message 72 to the terminal. That is clearly incorrect, however, since so far as the terminals are concerned, the SETUP message must start in the Originating Terminal 46 and be received by the Destination Terminal 44. A reversed SETUP message 74, passing from the Originating Terminal 46 to the Gatekeeper 40, is therefore required. This may be achieved in either of the following ways.

(a) The Gatekeeper 40 could send a message to the terminal 46 instructing it to send the SETUP message 74; and
(b) The Gatekeeper could act as an MC (Multipoint Controller), within the H.323 standard, which can by definition set up the Logical Channel Procedures for connecting any number of terminal endpoints together.

Figure 6:
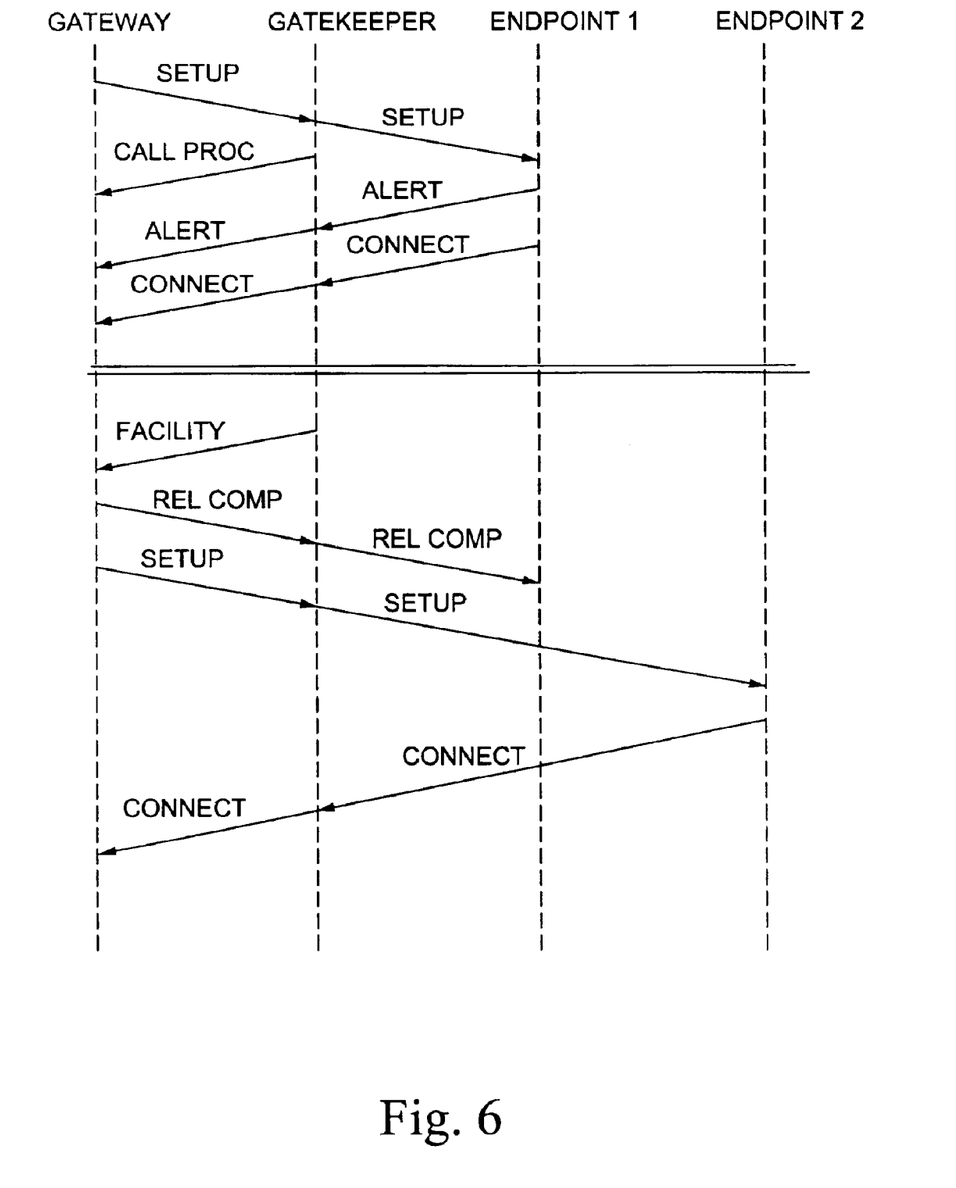
FIG. 6 shows how Call Transfer between endpoints may be used using Supplementary Services.
Figure 7:
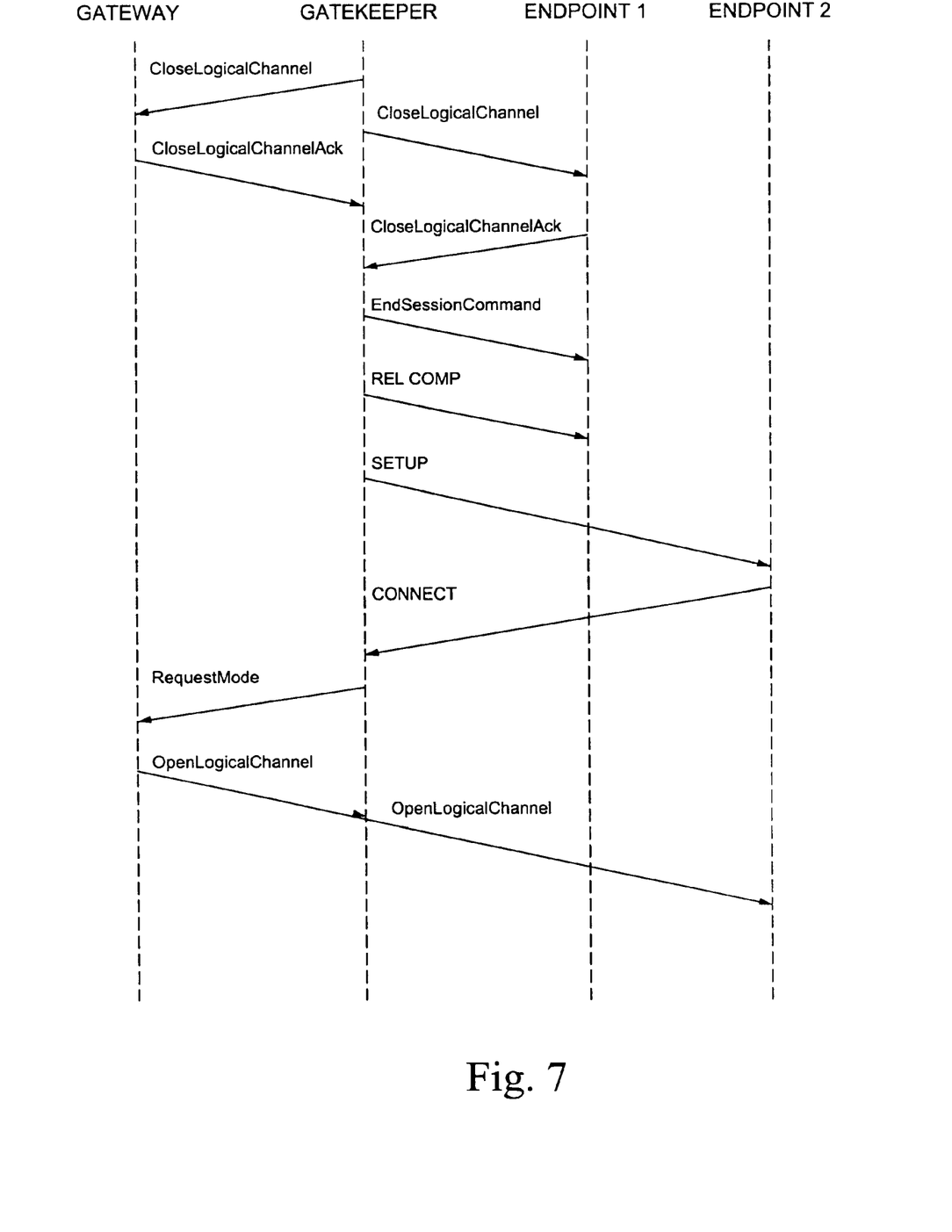
FIG. 7 is an alternative to FIG. 6, showing how Call Transfer may be achieved without using Supplementary Services.

Turning now to FIGS. 6 and 7, there are illustrated two methods by which call transfer may be achieved, still within the H.323 domain. This covers the situation where a call in progress needs to be transferred from a first terminal ("endpoint 1") to a second terminal ("endpoint 2").

The implementation shown in FIG. 6 makes use of Supplementary Services, and in particular the FACILITY call signalling message. In this implementation, the call to endpoint 1 is first set up in the usual way, as illustrated at the top of FIG. 6, above the double line. A SETUP message is first sent from the Gateway to the Gatekeeper, which passes it on to endpoint 1. The Gatekeeper then sends a CALL PROCEEDING signal to the Gateway, to advise the Gateway that a call is in process. Endpoint 1 then generates an ALERT signal, which the Gatekeeper then passes on to the Gateway. A CONNECT signal is then likewise generated by the endpoint 1 and is passed on by the Gatekeeper to the Gateway.

Now, turning to the lower section of FIG. 6, it is to be assumed that the call is to be transferred from endpoint 1 to endpoint 2. This is achieved by the Gatekeeper sending to the Gateway a FACILITY call signalling message which gives the Gateway the new H.323 number to call. The Gateway then issues a RELEASE COMPLETE message, which is passed to the Gatekeeper and to the endpoint 1. This releases endpoint 1. Next, a SETUP signal is issued by the Gateway; this is passed on to the Gatekeeper and then directly to the new endpoint, endpoint 2. Endpoint 2 issues a CONNECT signal back to the Gatekeeper, which passes it back to the Gateway. Endpoint 2 has thus been set up as the destination point for the call, in replacement for endpoint 1.

In this implementation, it will be seen that all messages pass through the Gatekeeper.

An alternative implementation, avoiding the use of the Supplementary Services FACILITY signal is shown in FIG. 7. This Figure shows how the call transfer is achieved, assuming that the call to endpoint 1 has already been set up in some way, for example using the signals shown in the upper part of FIG. 6.

In order to transfer the call from endpoint 1 to endpoint 2, the Gatekeeper first of all issues CloseLogicalChannel signals to both the Gateway and to endpoint 1. Both of these return CloseLogicalChannelAck signals back to the Gatekeeper. An EndSessionCommand is then issued by the Gatekeeper to endpoint 1, but this is not passed on to the Gateway. The call to endpoint 1 is then cleared by a REL COMP message, and a new call to endpoint 2 is set up by means of an outgoing SETUP and a return CONNECT signal. The Gatekeeper now has to make sure that the Gateway learns about the correct capabilities of the terminal at endpoint 2, without being aware that the endpoint itself has changed. It then issues a RequestMode signal to the Gateway, which may cause an OpenLogicalChannel request. This is then passed on by the Gateway to the endpoint 2, thereby opening up the logical channel with that endpoint. In this implementation, the Gatekeeper is acting very much like a Multipoint Controller (MC). That completes the detailed discussion of the signalling procedures within the H.323 domain. We now turn to a similar discussion of the signal flows within the CSTA domain.

Turning back to FIG. 4, it may perhaps first be useful to reiterate what happens within the H.323 domain when an incoming call is received. First, the Gateway 36 asks the Gatekeeper 40 for admission to the LAN using an ARQ message. The Gatekeeper either confirms with the ACF message, or rejects with the ARJ message. The Gateway then sends the SETUP message to the Gatekeeper.

The H.323 domain signalling then passes between the Gatekeeper and the Bearer Control 68, as follows:
(a) ARQ and SETUP messages pass from the Gatekeeper to the Call Management Layers, in other words to the Call Control Layer 66, the Bearer Control Layer 68, and the Application Layer (see Business Application 52);
(b) The SETUP message is then sent via the Gatekeeper 40 to the chosen terminal 44;
(c) The ALERT and CONNECT signals are then returned from the chosen terminal 44 to the Call Management Layers.

Figure 8:
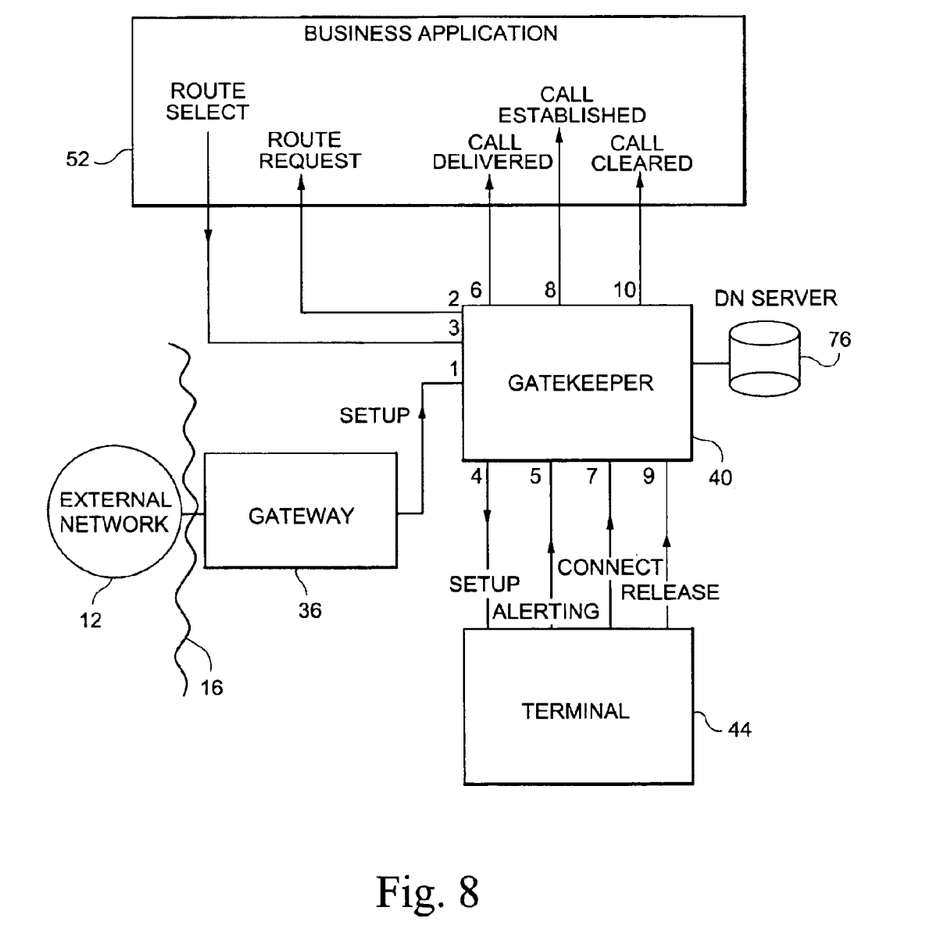
FIG. 8 is a simplified diagram showing the primary message flows within the Call Centre on receipt of an incoming call.

The message flows within the CSTA domain, on receipt of an incoming call, may best be understood by means of the simplified diagram shown in FIG. 8. This illustrates in schematic form both the H.323 and the CSTA messages which occur when an incoming call is received from the External Network 12 to the Gateway 36.

Following the numbered sequence in FIG. 8, the Gateway first requests access to the LAN, as previously discussed, and sends the Gatekeeper a SETUP signal 1. The Gatekeeper then sends a ROUTE REQUEST signal 2 to the Business Application, which responds with a ROUTE SELECT signal 3. This is then translated by the Domain Name Server 76, associated with the Gatekeeper 40, to provide the address of the required terminal 44. The Gatekeeper then sends a SETUP signal 4 to that terminal, and the terminal responds with an ALERTING signal 5. The Gatekeeper then reports that the call has been delivered, by means of a CALL DELIVERED signal 6 back to the Business Application. When the terminal 44 is ready, it sends a CONNECT signal to the Gatekeeper 7, which passes on a CALL ESTABLISHED signal back to the Business Application. When the call has been completed, the terminal sends a RELEASE signal 9 to the Gatekeeper, which itself passes on a CALL CLEARED signal 10 to the Business Application.

It will be appreciated that FIG. 8 provides only a simplified view of the CSTA message flows. In practice, other CSTA messages may also be used, as previously mentioned, such as for example Monitor Start, Monitor Response and so on.

The Business Application 52 desirably monitors the status of the terminal 44 at all times, for example to ascertain whether the terminal handset has been lifted. If the computer running the business application determines that the handset has been lifted, it will be clear that any subsequent calls to that terminal will need to be redirected to another terminal.

What is claimed is:

1. A multimedia telecommunications call centre comprising:
   a computer network adapted to carry addressed multimedia calls,
   a plurality of multimedia terminals each connected to a respective node of said computer network,
   a gateway to the computer network adapted to receive multimedia calls from at least one other network of transmission by the computer network,
   a call manager arranged to effect addressing to a desired one of the respective network nodes of received multimedia calls to effect connection of each such call to a desired one of said multimedia terminals, and
   a gatekeeper controlled by said call manager so that said gatekeeper determines for each offered multimedia call by said at least one other network the capacity available on the computer network and allowing or disallowing access of each said offered call to the computer network depending on the determined capacity.

2. A Call Centre as claimed in claim 1 in which the Gatekeeper comprises a node on the network.

3. A Call Centre as claimed in claim 1 in which the Gatekeeper communicates with the Call Manager across the network.

4. A Call Centre as claimed in claim 1 in which the Gatekeeper communicates with the Call Manager using CSTA standard protocol.

5. A Call Centre as claimed in claim 1 in which the Gatekeeper communicates with the Gateway across the network.

6. A Call Centre as claimed in claim 1 in which the Gatekeeper communicates with the Gateway using the International Telecommunication Union H.323 Standard Protocol.

7. A Call Centre as claimed in claim 1 in which communications between the Gateway and the Call Manager are mediated by the Gatekeeper.

8. A Call Centre as claimed in claim 1 in which communications between the Gateway and the Call Manager are mediated by the Gatekeeper, communications between the Gateway and the Gatekeeper being effected according to a first protocol and those between the Gatekeeper and the Call Manager being effected according to a second protocol, the Gatekeeper being associated with translation means for translation between the first and second protocols.

* * * * *